US007783767B2

(12) United States Patent
Collazo

(10) Patent No.: US 7,783,767 B2
(45) Date of Patent: Aug. 24, 2010

(54) SYSTEM AND METHOD FOR DISTRIBUTED MEDIA STREAMING AND SHARING

(75) Inventor: Caesar Collazo, Tarzana, CA (US)

(73) Assignee: SoftMD Technologies Inc., Santa Monica, CA (US)

( * ) Notice: Subject to any disclaimer, the term of this patent is extended or adjusted under 35 U.S.C. 154(b) by 368 days.

(21) Appl. No.: 11/900,909

(22) Filed: Sep. 12, 2007

(65) Prior Publication Data
US 2008/0140849 A1 Jun. 12, 2008

Related U.S. Application Data

(60) Provisional application No. 60/843,839, filed on Sep. 12, 2006.

(51) Int. Cl.
*G06F 15/16* (2006.01)
(52) U.S. Cl. .................. 709/229; 709/225
(58) Field of Classification Search .......... 709/204, 709/225, 229
See application file for complete search history.

(56) References Cited

U.S. PATENT DOCUMENTS

| 6,510,466 B1 * | 1/2003 | Cox et al. ............... 709/229 |
| 6,963,910 B1 * | 11/2005 | Belknap et al. ......... 709/223 |
| 7,032,243 B2 * | 4/2006 | Leerssen et al. ........... 726/17 |
| 2002/0184357 A1 * | 12/2002 | Traversat et al. ......... 709/223 |
| 2003/0126277 A1 * | 7/2003 | Son et al. ............... 709/231 |
| 2004/0162910 A1 * | 8/2004 | Kryeziu ................. 709/231 |
| 2006/0190715 A1 * | 8/2006 | Miller .................... 713/150 |
| 2007/0198713 A1 * | 8/2007 | Tsao et al. ............. 709/225 |

FOREIGN PATENT DOCUMENTS

EP 1694027 8/2006

OTHER PUBLICATIONS

International Search Report, PCT/US2007/020112.

* cited by examiner

*Primary Examiner*—Moustafa M Meky
*Assistant Examiner*—Uzma Alam
(74) *Attorney, Agent, or Firm*—Lerner, David, Littenberg, Krumholz & Mentlik, LLP

(57) ABSTRACT

A distributed media sharing and streaming system and method is disclosed, wherein an encrypted resident micro web server stores media files in a universal media format including an embedded, automated streaming media player, where the micro web server further fingerprints and authenticates media file contents, indexes media files, manages user permission, group permissions and sharing functionality, shares authenticated media files over a network via a distributed system employing other users on the network with the resident micro web server and the authenticated media file, shares media file and user information with a central index server, and streams authenticated media files to a sharing user using an embedded streaming media player regardless of whether the sharing user has the micro web server or any particular media codec.

3 Claims, 11 Drawing Sheets

SYSTEM AND METHOD FOR DISTRIBUTED MEDIA STREAMING AND SHARING

CROSS-REFERENCE TO RELATED APPLICATION

This application claims the benefit of the filing date of U.S. Provisional Application No. 60/843,839 filed Sep. 12, 2006, the disclosure of which is hereby incorporated by reference herein.

BACKGROUND OF THE INVENTION

Digital media content such as movies, music, games and the like are often distributed digitally in one of two ways: via central servers or via peer-to-peer systems. In central server media distribution systems, an entity such as a user-browsed web site, user-based computer application or user-controlled set-top box actively requests content from a group of one or more central servers over an open network such as the Internet or a closed network such as a cable television loop, wireless network (terrestrial or satellite-based), or POTS (plain old telephone service). Upon receipt of the request, the central server parses the request, creates a connection with the requesting entity, authenticates the entity, and delivers the requested media.

Peer-to-peer systems directly connect two or more entities such as user-based computer applications over a network. Through an index of connected users and/or of connected media content, users share media content and distribute the media content amongst themselves from computer to computer, e.g. from peer to peer. The index of users and content can be centrally located, as in the original music sharing system distributed under the trademark Napster®, or can be itself distributed among the users of the peer-to-peer network and actively updated as users join and leave regions of the ever-changing peer-to-peer network, such as the public peer to peer network commonly known as Gnutella. Some peer-to-peer networks increase efficiency of media distribution by permitting parallel sharing of portions of a particular media work amongst multiple users, using existing file transfer technologies such as those provided under the mark Bittorrent™, such that a peer-to-peer user may be downloading the last minute of a music media file while another user is obtaining the first minute of that music media file from that user simultaneously. Moreover, peer-to-peer networks are scalable in two senses: as more users join the network, more storage and more bandwidth becomes available for sharing, and as a particular media work becomes more popular, more copies of it are on the peer-to-peer network, thus reducing access time for more popular media works.

However, both central server and peer-to-peer server systems have distinctive drawbacks. Central servers can become strained and fail when under heavy and often unpredictable user demand. This is true even when a central server is distributed among many physical servers, or many network locations, through variable load-handling software available from vendors such as Akamai® and the like. Moreover, central servers concentrate the cost of media file distribution with the media file distributor: physical server owners often pay for the network bandwidth they use to distribute media files. While the cost of serving each particular media file is small, the combined costs of serving many media files to many users can be nontrivial. Finally, central server systems are also heavily centrally controlled, making them somewhat useful for presenting prepackaged content to users, but less useful for the sharing of user-created content among users of the network whose popularity is hard to predict.

Peer-to-peer networks have their own drawbacks. Because the structure of the peer-to-peer network is always changing, peer-to-peer networks can be unreliable at times. Moreover, because media files originate with individual unknown and unauthenticated users, peer-to-peer networks are often troubled by viruses, "trojan horse" malicious software pretending to be legitimate media files, pirated media content, and generally inaccurate indexing that is either reliant on the availability of a central server or on a constantly-changing set of users. As a result, it is sometimes difficult to reliably share a particular media file on presently available peer-to-peer networks. Peer-to-peer networks, due to the frequent lack of central control, are also difficult to monitor for inappropriate or unlicensed content. In the same vein, it is sometimes difficult to authenticate individual users of a peer-to-peer network, either to ensure file authenticity, to track down malicious files or illegitimate files, or to permit users to communicate amongst themselves reliably.

Moreover, media files themselves are subject to a plethora of frequently incompatible media formats. Some media formats, such as those available from RealNetworks®, require the user to separately download a player program. Others require the user to separately download one or more codecs, devices that can convert audio and video to a format visible to the user. Moreover, some media formats create large files, or are incompatible with some computing platforms. Some media formats are specifically implemented only for delivery as a complete file, while others are optimized or are only created for streaming of a media file to a user. Even streaming media file formats, however, frequently have many different codecs, and even many different version incompatibilities within the same codec, creating user frustration. Moreover, current streaming media formats typically involve a long initial delay while media is being "buffered," or transferred to a local memory cache, for pseudo-real time playback. Some media formats are only available for limited computing platforms, making some media files unavailable to those with unsupported computers or operating systems. Along the same lines, streaming media frequently suffers from pauses, skips and lags that vary from format to format. The result of these incompatibilities is that a user, in order to share media with a friend, must ensure that the media format is supported by the friend's computer and operating system, that the friend has a media player compatible with the media format, and that the friend has an appropriate codec downloaded for that particular media format along with all appropriate licenses.

Neither current media formats, current central server systems, nor current peer-to-peer networks are optimized for the user's own control of who can access that user's media and media format. In an age where users frequently want to share legitimate media files such as family photos, music, and other media amongst a small group of family members or friends, current systems make it difficult for a typical home computer user to (1) create a defined group of other users who have access to that user's media files, (2) authenticate the other users to grant them access to some or all of that user's media files, (3) authenticate the legitimacy of a media file and/or the right to share the file, and (4) provide the other users with a simple, universal method for obtaining access to and viewing media files that may be in a large number of different formats.

SUMMARY OF THE INVENTION

In accordance with an aspect of the invention, a method is provided for electronically sharing media content between users of respective user computers via a network. In such method, a first user computer is operated to perform one or more actions as follows. The first user computer may receive a media file and an instruction from a second user at a second user computer via the network. The instruction may direct the sharing of the media file. The first user computer may then cause the received media file to be stored in association with sharing information. The sharing information can be in accordance with the instruction. In one example, the sharing information may identify a user of the first user computer and users of one or more computers other than the first user computer who have permission to access the media file. Typically at or after such time, the first user computer may receive a request to access the media file from a third user via the network. When the sharing information indicates that the third user has permission to access the media file, the first user computer may cause the media file to be transmitted to the third user via the network. In such way, the sharing information can be used to control to which users the media file can be shared, in accordance with the instruction received from the second user.

In one embodiment of the invention, a recording medium is provided which has computer-readable instructions recorded thereon which are executable by a computer, e.g., the first user computer to perform the afore-described method.

In accordance with another aspect of the invention, a user-to-user system is provided for sharing media files which includes a plurality of user computers including at least one first user computer and a second user computer connectable to the first user computer via a network. In such system, each first user computer may include a media-sharing server. The media-sharing server may be operable to perform actions which may include receiving a media file and an instruction from a second user at a second user computer via the network. The instruction may direct the sharing of the media file. The first user computer may cause the received media file to be stored in association with sharing information, the sharing information typically being in accordance with the instruction. In one embodiment, the sharing information may identify a user of the first user computer and users of one or more computers other than the first user computer who have permission to access the media file. Typically at or after such time, the first user computer may receive a request to access the media file from a third user via the network. When the sharing information indicates that the third user has permission to access the media file, the first user computer may cause the media file to be transmitted to the third user via the network. In such way, the sharing information may be used to control to which users the media file can be shared, in accordance with the instruction received from the second user.

In accordance with one or more particular aspects of the invention, the media-sharing server is operable to generate the sharing information.

In accordance with one or more particular aspects of the invention, the user-to-user system may include a plurality of first user computers each having an instance of the media-sharing server.

In accordance with one or more particular aspects of the invention, the second user computer may be an other one of the plurality of first user computers having an instance of the media-sharing server operable to perform each of the afore-mentioned actions of the first user computer. In such case, the sharing information stored at the other one of the first user computers for a given media file can be different from the sharing information stored at the aforementioned first user computer. In this way, it may be possible to control access to each stored media file using the sharing information of the particular first user computer's media-sharing server having stored the media file.

In accordance with one or more particular aspects of the invention, the media-sharing server of each first user computer may be further operable to use information associated with the first user computer and information associated with the received media file to obtain a media access code and a media key. Such media key may be used to encrypt the media file to obtain an encrypted media file. When the first user computer stores the media file, such encrypted media file may be stored in association with the media access code and the sharing information. In conjunction with receiving a request for the media file from the third user computer, the first user computer may receive the media access code, e.g., from the third user or from another source. Using the media access code and the media key, the encrypted media file may be decrypted to obtain a decrypted media file, e.g., as performed or caused to be performed by the first user computer, for example. The decrypted media file can then be transmitted to the third user via the network, e.g., as performed or caused to be performed by the first user computer.

In accordance with one or more particular aspects of the invention, the system may include a third computer having an index server. The index server may maintain index information identifying the media files stored by the media-sharing servers of the respective first user computers. Alternatively or in addition thereto, the index server may maintain information for establishing communication with each respective first user computer. The index server may be further operable to assist in establishing communications paths through the network between the computers of third users who request media files and the media-sharing servers of the first user computers having stored the requested media files.

In a particular embodiment, the index server may be operable to update the information for establishing communication with the respective first user computers at predetermined intervals.

In a particular embodiment, the media-sharing servers of each respective first user computer may be operable to transmit at least a portion of the sharing information to the index server. Upon receiving the transmitted portion of the sharing information from the respective first user computer, the index server may be operable to update the information for establishing communication with the respective first user computer.

In a particular embodiment, in connection with causing transmission of the stored media file to the third user, the first user computer may transmit a link or cause such link to be transmitted to the second computer, the link representing the requested media file. The first user computer may then cause the requested media file to be streamed to the second computer upon execution of the transmitted link.

In a particular embodiment, respective first user computers may locally store at least some of the media files.

In accordance with one or more particular aspects of the invention, each respective first user computer may be further operable to authenticate users who request access to media files stored by the respective first user computer.

In accordance with one or more particular aspects of the invention, each respective first user computer may be further operable to authenticate rights of the user relative to a media file requested by such user.

In accordance with one or more particular aspects of the invention, each first user computer may be further operable to authenticate sharing information associated with at least one of a particular media file or a particular user.

In accordance with one or more particular aspects of the invention, each first user computer may be further operable to create a media file fingerprint from media data associated with each received media file, and use the media file fingerprint to authenticate the received media file.

In accordance with one or more particular aspects of the invention, each respective first user computer may be operable to determine when sufficient rights are not available for sharing the received media file. When such first user computer determines that sufficient rights are not available, such first user computer may avoid causing the requested media file to be transmitted to the third user. In a variation of such aspect, when such first user computer determines that sufficient rights are not available for sharing a media file received from the second computer for that purpose, the first user computer may avoid causing such received media file to be stored in the first place.

In accordance with an aspect of the invention, a secure universal media sharing system (UMSS) is provided for distributed sharing of media content, including a secure encrypted micro web server for storing media files having a media data, original media metadata, and an original media data format, for a local user on a computer and for sharing the media files over a network connected to the computer; a media file fingerprinting module for creating media file fingerprints associated with the media file metadata authenticating the content of the user's media files regardless of the original media file metadata; a local user sharing index based on the user's media files and media file fingerprints stored by the micro web server on the computer; a global sharing index of media file fingerprints, media file metadata, local users, and local user metadata available to the micro web server over the network to authenticate the media files, the local user and other users; a sharing group index of other users authorized to access one or more of the media files available through the micro web server over the network, a user authentication module of the micro web server for authenticating other users for access to the micro web server based on independently verifiable data associated with the other user; a media conversion module for converting the media files to a universal media format handled by the micro web server and the original media metadata to a universal media metadata format, the universal media format including an encapsulated streaming media player coupled to the header of universal media metadata; a media distribution module for at least one of distributed sharing and distributed streaming of a media file; and, a media sharing module for distributing to an other user, upon an authenticated request for a media file over the network from the sharing other user to the micro web server, such that the sharing user begins to receive the media file in the universal media format and playback begins of the media file at the sharing user through the encapsulated streaming media player without further user intervention and without requiring user installation of a media codec.

In one embodiment, the universal media format further includes universal media metadata further including digital rights management information, said digital rights management information being transferred from the original media metadata associated with the media file and said digital rights management information being encapsulated in said universal media metadata upon said transfer.

In one embodiment, the independently verifiable data associated with another user is an authenticated e-mail address and an authenticated unique user identification value, said authenticated e-mail address obtained via an e-mail authentication module that confirms the validity of an other user's e-mail address without further other user intervention and via an authenticated unique user identification value associated with the other user's micro web server.

DETAILED DESCRIPTION

Figure 1:
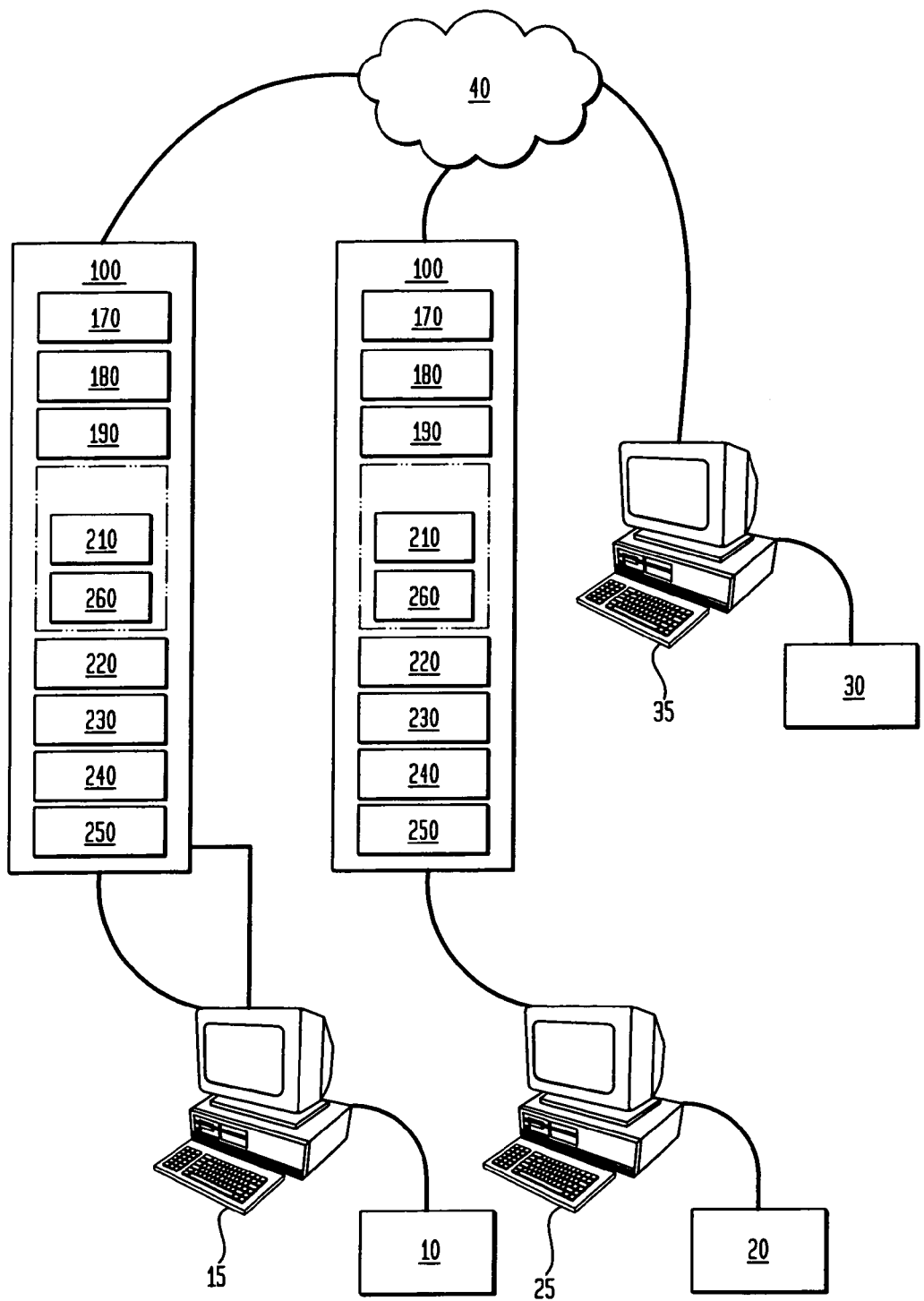
FIG. 1 is a schematic representation of a network including a plurality of users employing one embodiment of a media distribution system of the present invention.

In a network, as shown in FIG. 1, a plurality of users (hereinafter referred to as Alice 10, Bob 20 and Carol 30), are each associated with a user computer A 15, user computer B 25 and user computer C 35. Each user computer A 15, B 25 and C 35 is coupled to a network 40 such as the Internet, a closed cable-loop network, a wireless network, a POTS (plain old telephone system) network, a satellite network, and the like. Each of the computers A 15, B 25 and C 35 are running a computer operating system such as those available from Microsoft®, Apple®, Sun®, IBM®, from multiple sources under the trademark LINUX®, a variant of the BSD operating system, a variant of the UNIX operating system, an embedded operating system such as is available from vendors such as Wind River Systems, MonteVista, and the like or any other operating system. Accessible to A 15, B 25 and C 35 over the network 40 is a network server 45. Alice 10, Bob 20, and Carol 30 may control their respective computers A 15, B 25 and C 35 directly or remotely through the network 40.

On at least computer A 15 and B 25, users Alice 10 and Bob 20 have respectively installed a micro web server 50. The micro web server 100, includes, for example, a small software program compiled for the particular operating system on which computer A 15 and B 25 respectively operate, that incorporates a plurality of modules, i.e., sets of related instructions which are executable by a computer to perform media file sharing, security and storage functions. These modules include at least some of, but are not limited to: a secure micro web server module 100, a media file storage and indexing module 170, a media file fingerprinting module 180, a user security module 190, a media file conversion module 200 for a universal media format 210 and an encapsulated universal streaming media player 230, optionally including a digital rights management encapsulation module 220, a user sharing group module 240, a global indexing module 250 resident on a remote network server for managing user and media data, a sharing user authentication module 260. These modules employ the memory, storage, network connection and processor of the computers A 15 and B 25, as controlled by the micro web server, to provide distributed media sharing and streaming functionality. These modules typically are stored on a computer-readable recording medium such as a magnetic disk, optical disk tape, removable disk drive, solid state memory or other storage medium which can be local to the computer or can be accessed electronically from a remote computer via a network.

Figure 2:
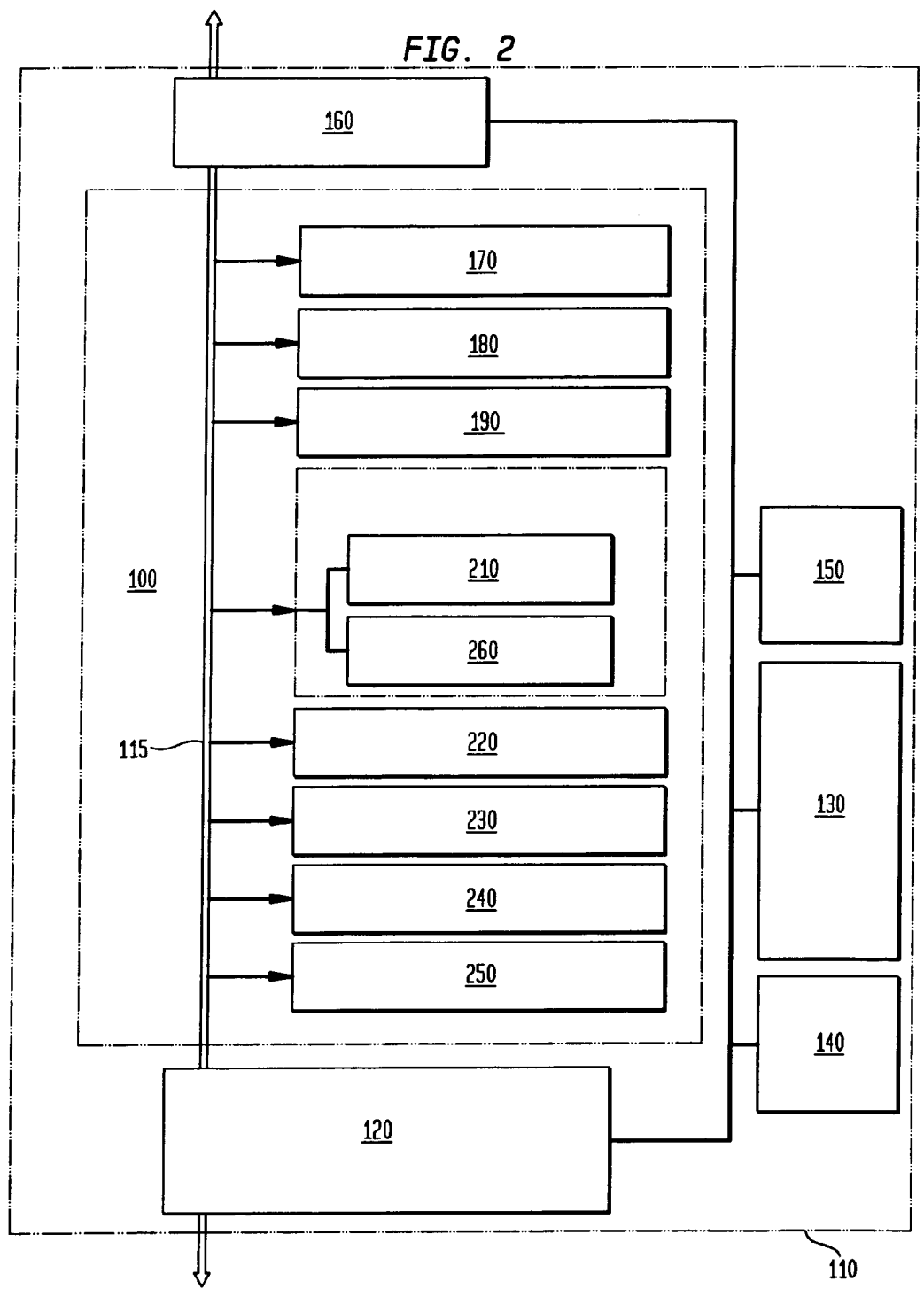
FIG. 2 is a representational via of one embodiment of the media micro server of the present invention.

Micro Web Server Module. FIG. 2 shows a representational view of one embodiment of a micro web server 100, in this case a secure, encrypted micro web server module 100. The micro web server 100 is installed on a local user's computer system 110. The computer system may be, for example, a traditional computer, a set-top box, a portable media player having internet connectivity, a media-capable cellular phone, a personal digital assistant (PDA), or the like. Typically, although not necessarily, the computer 110 will communicate over at least one main data bus 115 and may include a processor 120, a memory 130, a non-volatile storage medium 140, a display 150, and a network interface 160. The micro web server 100 may require only a small memory "fingerprint" on the computer 110, permissably although not necessarily requiring less than 150 kB of memory to reside, and more preferably although not necessarily requiring less than 100 kB of memory to reside. The micro web server 100 includes the core functionality of a standard web server in that it can transmit and receive HTTP (hypertext transfer protocol) or similar requests and methods, most commonly GET and PUT, as well as other methods as described in the IESG/IETF (Internet Engineering Steering Group/Internet Engineering Task Force) Request For Comment Nos. 1945 (1996), 2616 (1999), and other standards related to the HTTP protocol. In particular, the micro web server preferably supports at least secure sockets layer (SSL) communications via HTTP port 443 or other ports, in order to support basic encryption functionality for transactions implemented through the micro web server, and the micro web server may support further forms of encryption such as public key encryption using Diffie-Hullman or RSA style public/private key pairs, AES NIST (Advanced Encryption Standard of the National Institute of Standards and Technology) encryption or a later officially approved encryption standard, one way hash functions and fingerprints, and the like. For example, in one embodiment, SSL (Secure Sockets Layer) transactions are replaced with RSA encrypted private key certificates associated with at least 1024 bit private RSA keys, and transactions are authenticated by sending certificate signing requests to an encryption certificate signing authority such as those currently provided by Thawte® and the like.

The micro web server 100 is typically stored as a software binary in permanent storage 140 such as a hard drive, persistent flash memory, optical disk or optical memory, or over a network memory. Alternatively, the micro web server may be stored in a permanent or flashable hardware device as part of some computers such as, for example, portable media players and media-capable cell phones. In addition, persistent but volatile memory can be used, such as, for example, that used in some flashable BIOS (basic input output system) systems. Upon initialization of the micro web server, the micro web server resides in memory on the computer, where it monitors incoming HTTP requests, transmits outgoing HTTP requests, and implements various maintenance and security operations from the network interface 160. The micro web server maintains a connection to network communications via the standard network API for the particular operating system and computer on which the micro web server is implemented.

As described previously with respect to FIG. 1, the micro web server 100 may include a number of accompanying modules, including a media file storage and indexing module 170, a media file fingerprinting module 180, a user security module 190, a media file conversion module 200 for a universal media format 210 and an encapsulated universal streaming media player 230, optionally including a digital rights management encapsulation module 220, a user sharing group module 240, a global indexing module 250 resident on a remote network server for managing user and media data, a sharing user authentication module 260. Although described in substantially more detail below, the micro web server's basic file sharing functions come in three submodules: a media submission module, a media request module, a media serving module, and a local maintenance/security operations module.

Figure 3:
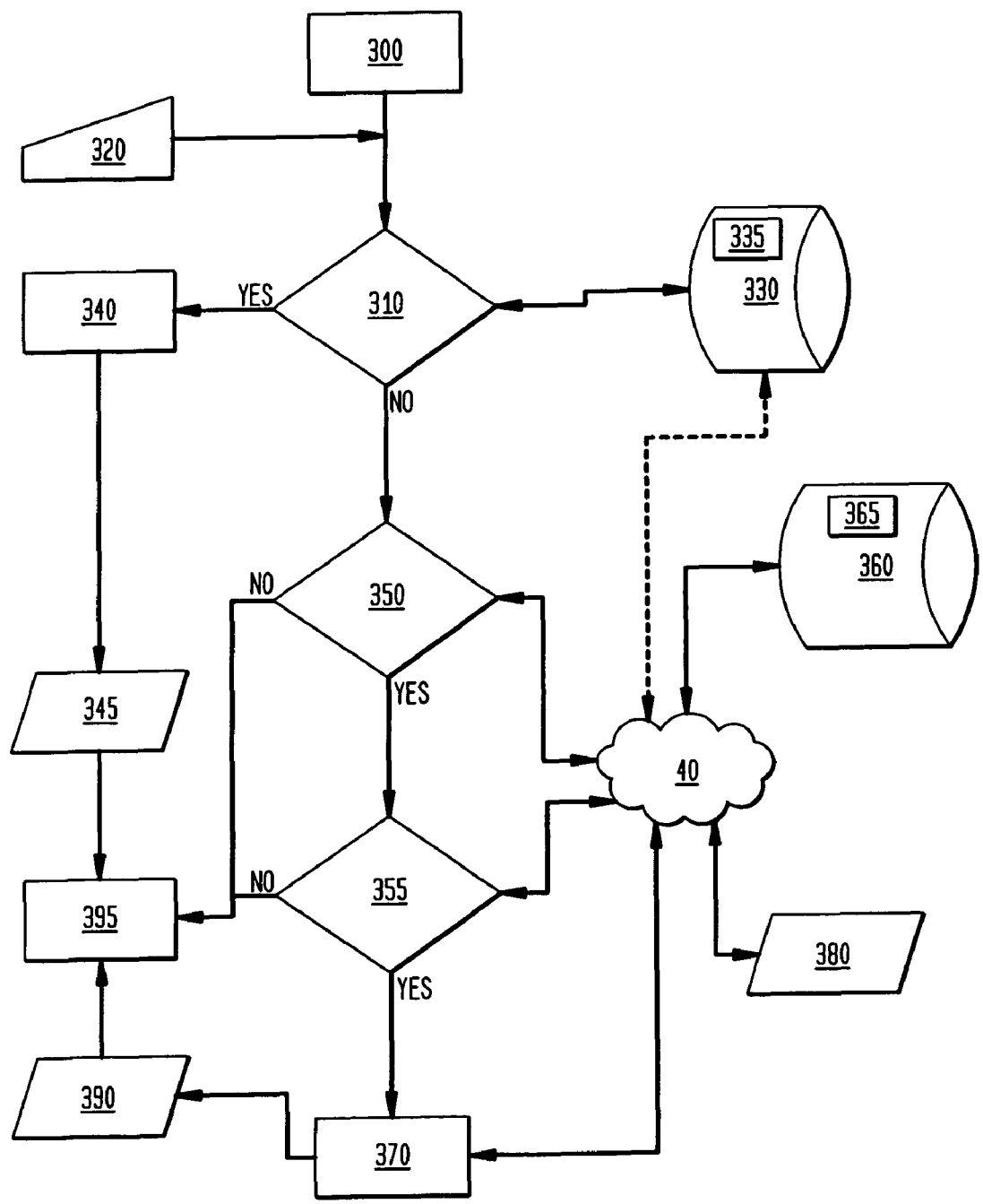
FIG. 3 is a functional flow chart illustrating a media submission process via a media micro server according to an embodiment of the present invention.

For submitting media, the micro web server, in one embodiment shown in FIG. 3, performs the steps of: (1) receiving a user request to submit a media file as part of a local sharing group; (2) checking the local index and, optionally, other local indexes of group members for that particular file; (3) if the file is already in the local sharing group, returning a link to that file; (4) if the local index includes the requested media file as stored on another user's computer, returning a link to that file on the another user's computer; (5) if the file is not available, determining the file type and converting it to a universal media format; (6) indexing the file with basic file type and specific file information; and (7) adding the file to the local index and, if shared, to the local sharing group index and to the global index.

In one particular embodiment, the media submission process 300 begins with the submission of a media file request 320. In a comparison step 310, the media file 320. At a comparison step 320, the media file is hashed and is compared to a local index 330 of media files via the fingerprinting process described below (see FIG. 8): if the comparison shows a matching media file 335 in the local index 330, then in a link receipt step 340 a media link 345 is returned to the user with a link to the media file 335 either on a local computer or on a computer to which the user has access via the micro web server, after which the submission process ends 395.

If the comparison does not show a matching media file in the local index 330, then in a media format determination step 350 the media submission 320 is compared to a database of known file types 360, including media files available over a network 40 to determine whether a matching media file type 365 is part of the file type database 360. If not, then the process ends 395. If the media file type 365 is available, then an optional digital rights confirmation step 365 is performed to determine whether sufficient rights are available for the media submission 320 of media file type 365 to be converted to a universal media format. In particular, the media submission 320 can be compared over a network using digital rights access information 380 available over the network 40. If sufficient rights to convert the submitted file 320 are not available, the submission process ends 395. If sufficient rights are available for conversion, then a universal media format conversion process 370 is performed based on the known media file type 365. The universal media format conversion process is discussed in more detail below, and creates a universal media format version of the submitted media 320, and adds basic information 335 about the submitted file to the local index 330, either from information submitted along with the submitted media 320 or obtained over the network 40 based on an identification of the submitted media 320 based on its media fingerprint found in comparison step 310. Finally, a link to the universal media format version of the submitted file 390 is returned, and the submission process ends 395.

Figure 4:
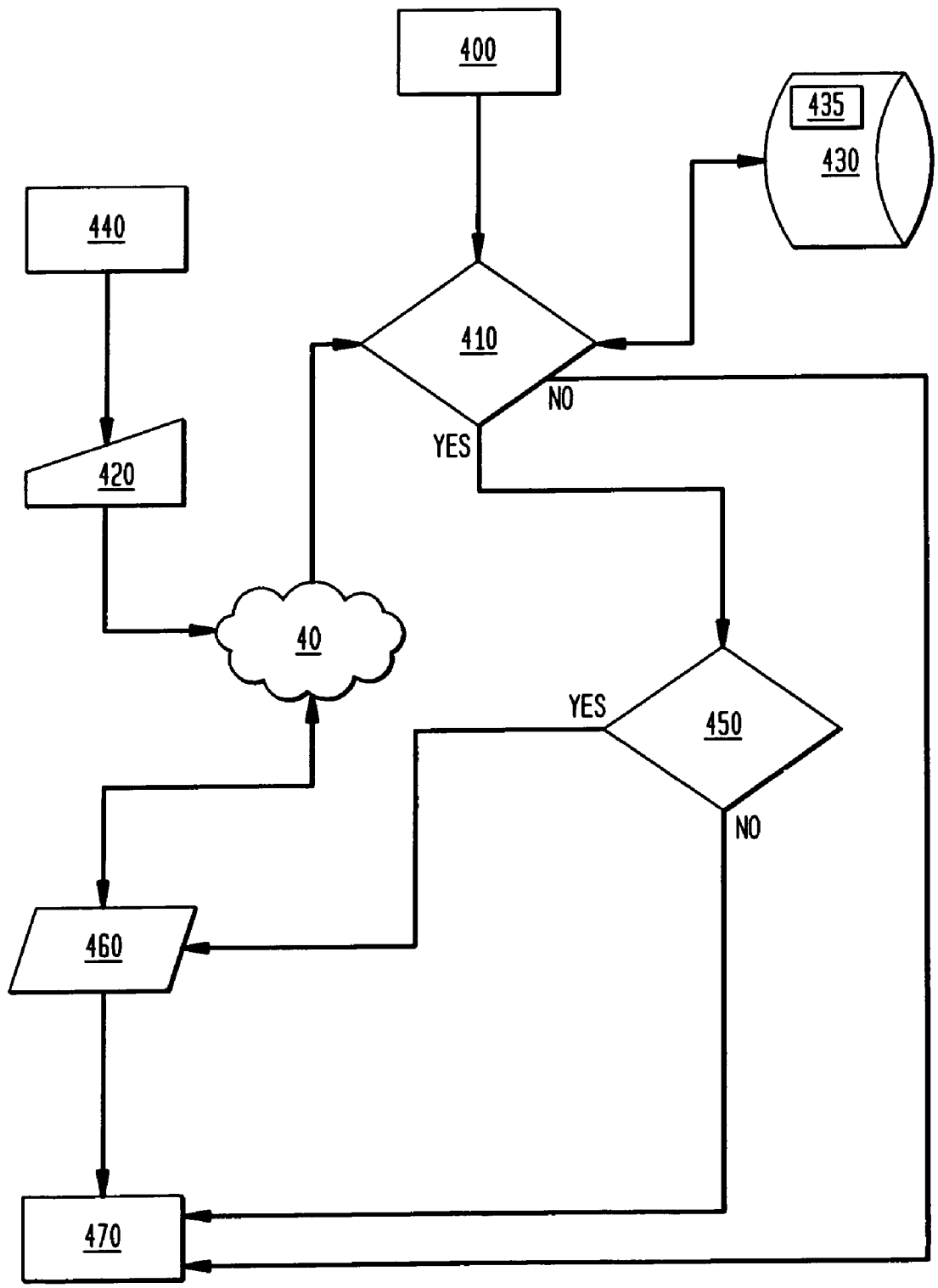
FIG. 4 is a functional flow chart illustrating a media file request process via a media micro server according to an embodiment of the present invention.

For receiving requested media, the micro web server, in one embodiment shown in FIG. 4, performs the steps of: (1) receiving a user request for a media file from a local user on the computer; (2) comparing the requested media file to a local index associated with the micro web server; (3) if the local index includes the media file as stored on the computer, returning a link to the media file on the computer to the local user or if the local index includes the requested media file as stored on another computer for which the local user has sharing access, returning a link to the media file on the another computer to the local user; (4) if the local index does not include the requested media file, seeking a global index from a remote central index server, and if said global index is accessible, comparing the requested media file to the global index to find a set of other users hosting the requested media files and returning a link to the media file on the other users' computers to the local user on the local computer; (5) upon the local user clicking upon a link to the requested media file if supplied, streaming the requested media file from at least one of a local media store and a remote media store to the local user at the computer. The micro web server may also perform the step of authenticating the integrity of the media file, authenticating the local user, authenticating the local user's rights to play, stream and/or copy the media file, and authenticating the sharing list associated with the media file and/or local user.

In one particular embodiment, the media request process 400 begins with the receipt of a media file request 420, either locally or over a network 40, from a user 440. In a comparison step 410, the media file request 420 is compared to a local index 430 of media files via the fingerprinting process described below (see FIG. 8): if the comparison shows no matching media file, the process ends 470 (and may then proceed to a search of a global index of users on a network described below). If the comparison finds a matching media file 435 in the local index 430, then in a request authorization comparison step 450, the micro web server determines whether the requesting user 440 is authorized to receive the requested media 435. If the user 440 is not authorized, then the process ends 470. If the user 440 is authorized, then a link 460 to the requested media is returned to the user 440 and the process ends 470.

Alternatively, if the local index comparison step 410 does not show a matching media file in the local index 430, then in a global index decision step the media request is compared to a global index including media files available over a network 40 to determine whether a matching media file 365 is available over the global index. If not, then the process ends 395. If the media file is available, then global user decision step determines if there are other users who have the requested media file via the global index. If there is no match to other users maintaining the media file, the decision step fails and the process ends. If a match is found to a media file on the global index, then a list of users maintaining that media file is returned from the global index. In a link receipt step, one or more links to a remote user source of the media file are provided to the user, and the process ends. In this embodiment, the global index only provides access to media files for which all users are authorized for access, but user permissions as described below may also be implemented in such a system, as may digital rights management controls on media distribution.

Figure 5:
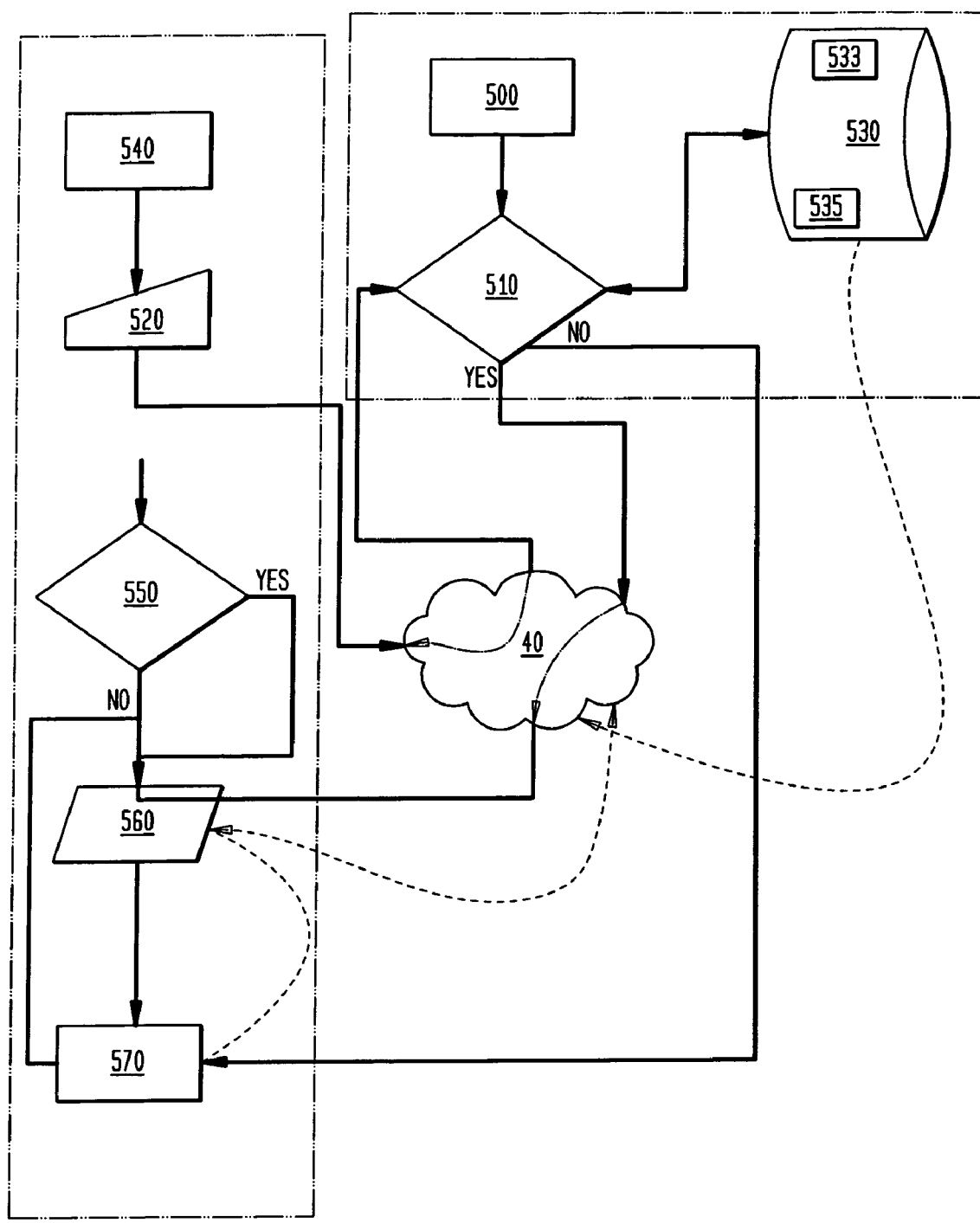
FIG. 5 is a functional flow chart of one embodiment of media file streaming via a media micro server in one embodiment of the present invention.

For serving and streaming requested media, the micro web server, in one embodiment as shown in FIG. 5, performs the steps of: (1) receiving a request for a media file from a remote user on another computer via a network; (2) comparing the requested media file to a local index associated with the micro web server; (3) if the local index includes the media file on the computer, serving a link to the remote user on another computer representing the requested media file on the computer; (4) upon execution of the link to the requested media file by the remote user on the another computer, streaming the requested media file from the computer to the remote user on the another computer. The micro web server may also perform the step of authenticating the integrity of the media file, authenticating the local user, authenticating the local user's rights to play, stream and/or copy the media file, and authenticating the sharing list associated with the media file and/or local user.

In one embodiment, the media serving/streaming process 500 begins with the receipt of a media file request 520 from a system user 540 over a network 40 (although the user may be local, in which case the network 40 only needs to use the local network loopback interface or may circumvent the network connection all together in serving media locally). In a comparison step 510 a the media serving location, the media file request 520 is compared to a local index 530 of media files via the fingerprinting process described below (see FIG. 8): if the comparison shows a matching media file 533 in the local index 530, then in a media authorization comparison step 450 it is determined whether the requesting user 540 is authorized to receive the requested media stream, based on whether the requesting user 540 is a member of the local group permitted access to the media database and/or whether the requesting user 540 has sufficient digital rights management rights to stream the requested media. If not, then the process ends 570. If access is granted, then a link to the requested media 560 is returned to the requesting user 540 over the network 40, through which the requested media 433 is streamed over the network 40, after which the process ends 570.

Figure 6:
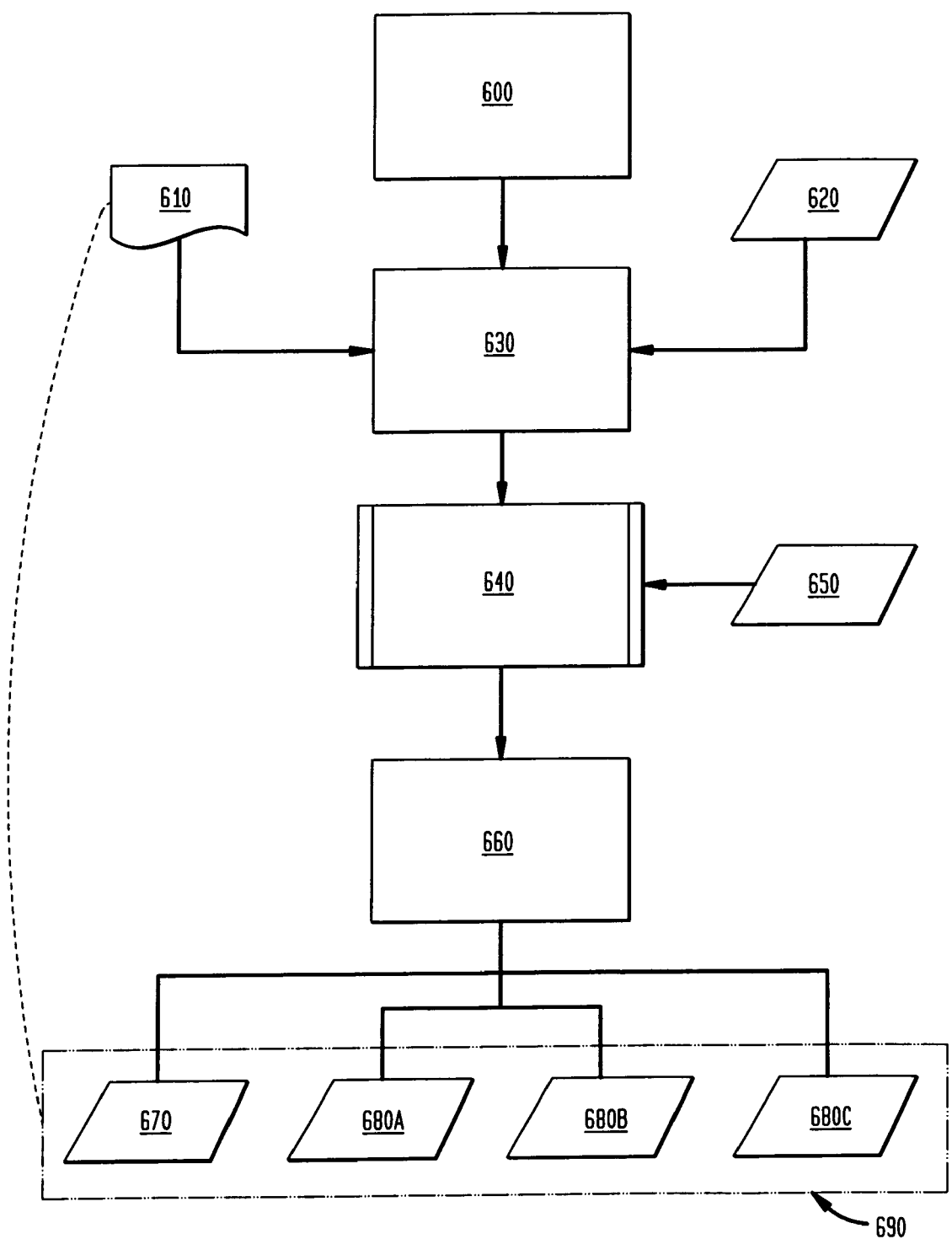
FIG. 6 is a representational flow chart of a micro server media key generation process in accordance with an embodiment of the present invention.

Preferably, the micro web server is secured and is permanently associated with the computer on which it resides, via use of a local security algorithm to provide a local user with a four digit key securely associated with the micro web server and media files associated with the micro web server. In one embodiment, the security algorithm employs four principal steps, as shown in FIG. 6.

First, in a micro web server key generation process 600, a private key is obtained or calculated for a particular media file 610. During this process, the meta file data or fingerprints for the media file can be used to create an SSL or RSA certificate 620 and a private key associated with the computer can be obtained which are associated with the particular micro web server and/or end user, in a key initiation step 630. Second, a cryptographic function step 640 using the standard UNIX® crypt( ) function as described in IETF Requests for Comment Nos. 1421 (1993) and 2045 (1996) is performed using the media information and the private key. As a SALT seed for the crypt( ) command, a unique initial value 650 such as a GUID (globally unique identifier) associated with the end user's computer, or more preferably, a UNIX-style timestamp value, is obtained and is mathematically transformed via a conversion function that translates the timestamp value or GUID value into a format acceptable for the SALT variable in the crypt( ) function. Then, the output of the crypt( ) function, a string of at least 128 bits 690, is divided into 64 bit blocks in a string output division step 660. The first 64 bit block 670 is translated into a media access code such as a four-digit code that is presented to a local user on the machine for association with media files to be stored in the media file store. The second 64 block 680*a* and additional blocks 680*b*, 680*c* form a media key value (for DES, AES, and the like) that are used for encryption of the media files to be stored in the media file database associated with the micro web server on the computer, as described below.

Figure 7:
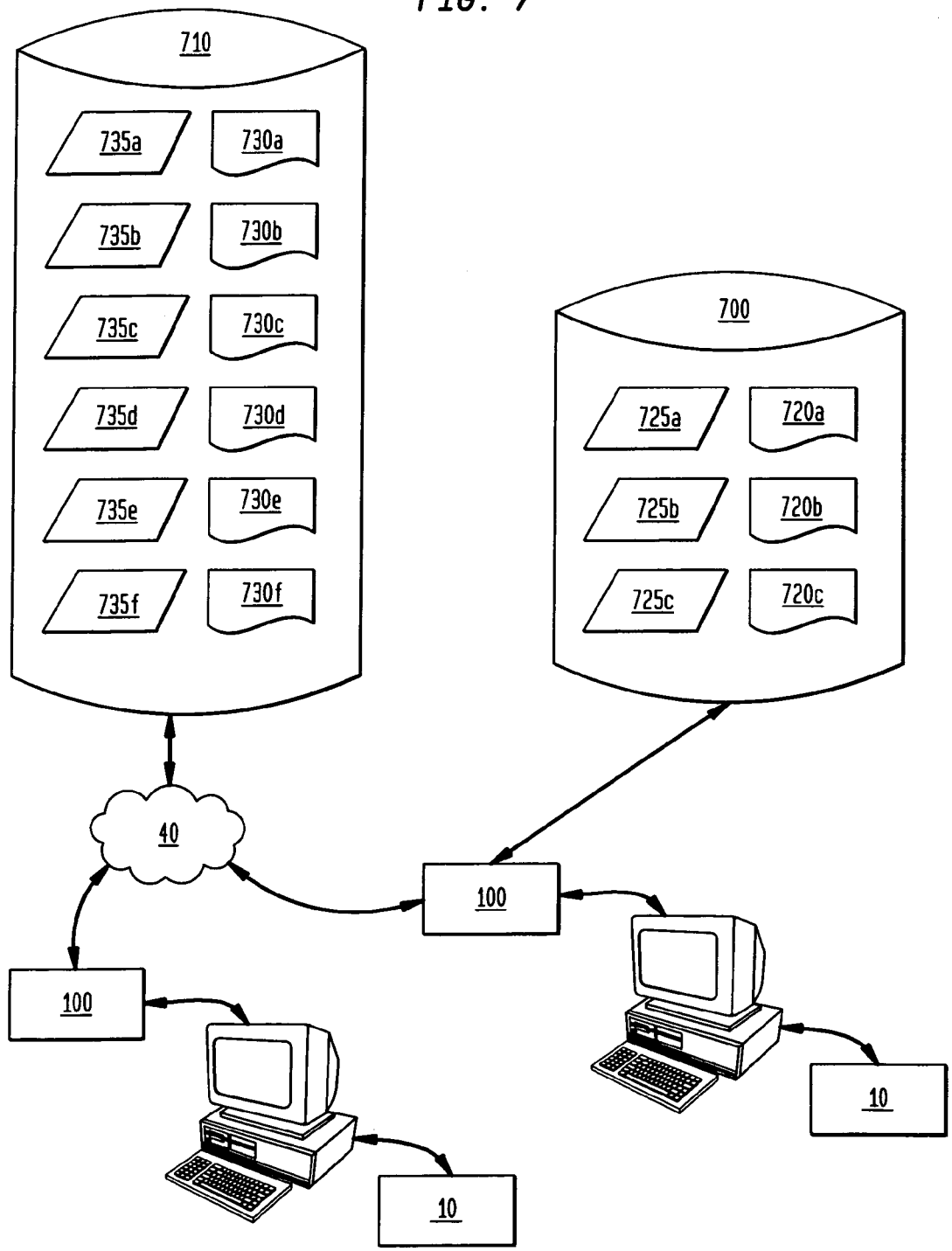
FIG. 7 is a topological representation illustrating media file storage and indexing using a media file local index and global index in accordance with an embodiment of the present invention.

Media File Storage/Indexing Module. Associated with the micro web server 100 is a media file store accessible to the computer on which the micro web server 100 is operated, one embodiment of which is shown in FIG. 7. The media file store 700 is preferably locally part of a micro web server 100 stored at an end user's 10 computer 25, but locality is not a requirement. For example, the local media store database 700 may be associated with a micro web server 100 but accessible to a computer 10 only over a network 40. In the local media store 700, each media file 720*a*, 720*b*, 720*c* is associated with media file index data 725*a*, 725*b*, and 725*c*, respectively, one exemplary embodiment of which is described in Table 1, below, or of the various media file metadata types described herein or that are known in the art. Similarly, in the network media store database 710 media files 730*a*-*f* are associated with media file index data 735*a*-*f* which can also be of the type shown in Table 2, or of the various media file metadata types described herein or that are known in the art.

Upon receipt of a media file for storage, streaming, sharing or playback, the media file is fingerprinted, indexed, and locally stored (unless media file metadata prohibits local storage). Using the media key value described above, the locally stored media files are encrypted with the media key to prevent unauthorized access to the media files stored in the media file store. A local user or authorized sharing user can thus access the media files in the media store by providing the media access code discussed previously, which, combined with the media key value, properly decrypts the media file for streaming, playback or sharing. In one embodiment, the index includes the following information for each media file:

TABLE 1

| Local Index | Data Value |
| --- | --- |
| Media Fingerprint | 256 bit value |
| Global Title | 256 byte text string |
| User's Title | 256 byte text string |
| Media Metadata | data structure pointer |
| Digital Rights Management Metadata | data structure pointer |
| User Groups/Permissions | identification of users and user group permissions |
| Media access key | 60 bit key string |

The media access code presented to users is preferably based on data associated with the computer on which the media file is stored, the same media file will have a different media access code on different machines. As such, the media access code assists in preventing unauthorized or illicit sharing of media files or copying of media files because the encryption step on each machine renders a media file in the media store useless on another computer unless it is obtained on the another computer via a transaction authorized by the micro web server.

Once the media file is stored, the metadata associated with the media file is indexed in a local media index associated with the micro web server. The local media index provides a searchable list of media files and related metadata (updated in near-real time in one embodiment, or occasionally updated upon access to the media store in another embodiment), to determine the content, availability, authenticity, file characteristics, authorized users, and the like associated with each particular media file. In some embodiments the local index file is also shared with a global index stored on a remote central server, to provide a central location for managing access to and indexes of available media

TABLE 2

| Global Index | Data Value |
| --- | --- |
| Media Fingerprint | 256 bit value |
| Global Title | 256 byte text string |
| File Locations | data structure pointer |
| Media Metadata | data structure pointer |
| Digital Rights Management Metadata | data structure pointer |
| Global file permissions | identification of users and user group permissions |
| Advertising metadata | data structure pointer |
| Media access key | 60 bit key string |

Media File Fingerprinting Module. Upon receipt of a media file, the media file is fingerprinted to confirm its authenticity and to relate the authenticated media file to other copies of the same media file stored by other users. One embodiment of this fingerprinting process is shown in FIG. 8.

Figure 8:
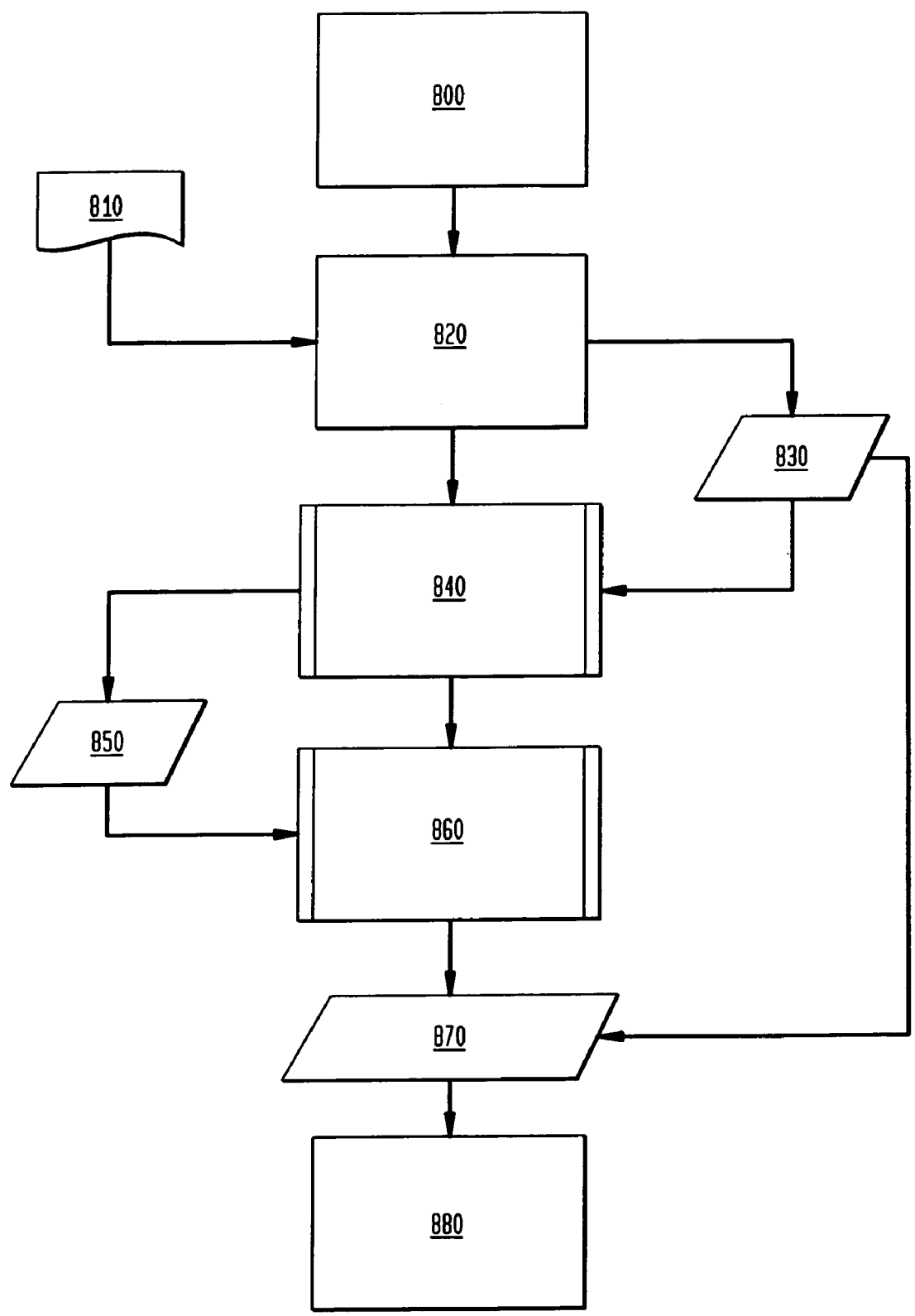
FIG. 8 is a functional flow chart of one embodiment of a media file fingerprinting process of a media micro server of the present invention.

The fingerprinting process creates unique, verifiable media file fingerprints via a three step process as shown in one embodiment in FIG. 8: (1) the beginning of the media data in the media file is examined to determine the actual media type, (2) the media data is filtered for only a limited range of data stored therein (such as, for example, ASCII characters), (3) the limited set of filtered media data is fingerprinted via a standard hash function such as the MD5 algorithm to create a substantially unique fingerprint for the media data, and hence for the media file. More specifically, a media fingerprinting process 800 begins with the submission of a media file 810. In a media data examination step 820, the beginning of the data in the media file 810 is inspected to determine the actual media type 830. Then, in a media filtering step 840, the media file 810 is filtered to leave only a predetermined subset of media data 850, such as, for example, only ASCII characters using the formula of Equation 1, below. Finally, the predetermined subset of media data 850 is submitted to a hash function 860 such as, for example, MD5 or SHA1, resulting in a unique hash string 870 for the media file and a known actual media type 830 for the media file 810. The hash string 870 becomes a media fingerprint stored in the media store described above along with the actual media type 830, and the process ends 880.

The local user can also provide a self-description for the media file to further facilitate accurate determination of file contents in the overall system, among local sharing users, and locally on the user's computer. Algorithmically, the fingerprinting module can be described as follows:

$$\text{Mediafile.fp} = \text{md5 (strings (Mediafile.md))} \qquad (\text{Eq. 1})$$

where Mediafile.fp is the fingerprint for Mediafile, Mediafile.md is the media data associated with Mediafile, the strings( ) function is the standard UNIX® strings( ) function for extracting ASCII characters from a data stream, and the md5( ) function is the practical, but collision susceptible, md5 hash algorithm as described in IETF Request For Comment No. 1321 (1992).

User Security Module. Individual users associated with a computer on which the micro web server is installed are preferably presented with security options analogous to those available to users in the UNIX® security model. Thus for each local user, a password and local profile are created: the password is preferably not stored in plain text but is instead stored in a shadow file that stores one-way information sufficient to authenticate the password, such as a hash function of the password, but does not store the password itself. The local profile preferably includes user name, user contact information including but not limited to contact information such as e-mail addresses, instant messaging addresses, alternative user names, pictures, telephone and mail contact information, social network information such as hobbies, media styles and preferences, user demographics, and the like. As used herein, the local profile is sometimes referred to as user metadata.

Preferably the user metadata may be associated with the user's password in such a way as to protect the user's privacy. Individual local users can thus be individually (or as a group associated, as described below with respect to sharing groups) associated with one or more media files in the media file store for permission to access, stream, play back, or share the media files stored therein.

TABLE 3

| File Metadata | Data Value |
|---|---|
| Universal media player | javascipt/jar file |
| File name | text string |
| File type | integer |
| File library/genre information | data structure pointer |
| File size | double |
| File playback time | double |
| File author/owner | data structure pointer |
| Copyable? | binary |
| File partition | data structure pointer |
| File type-specific metadata | data structure pointer |
| Media access key | 60 bit key string |

Figure 9:
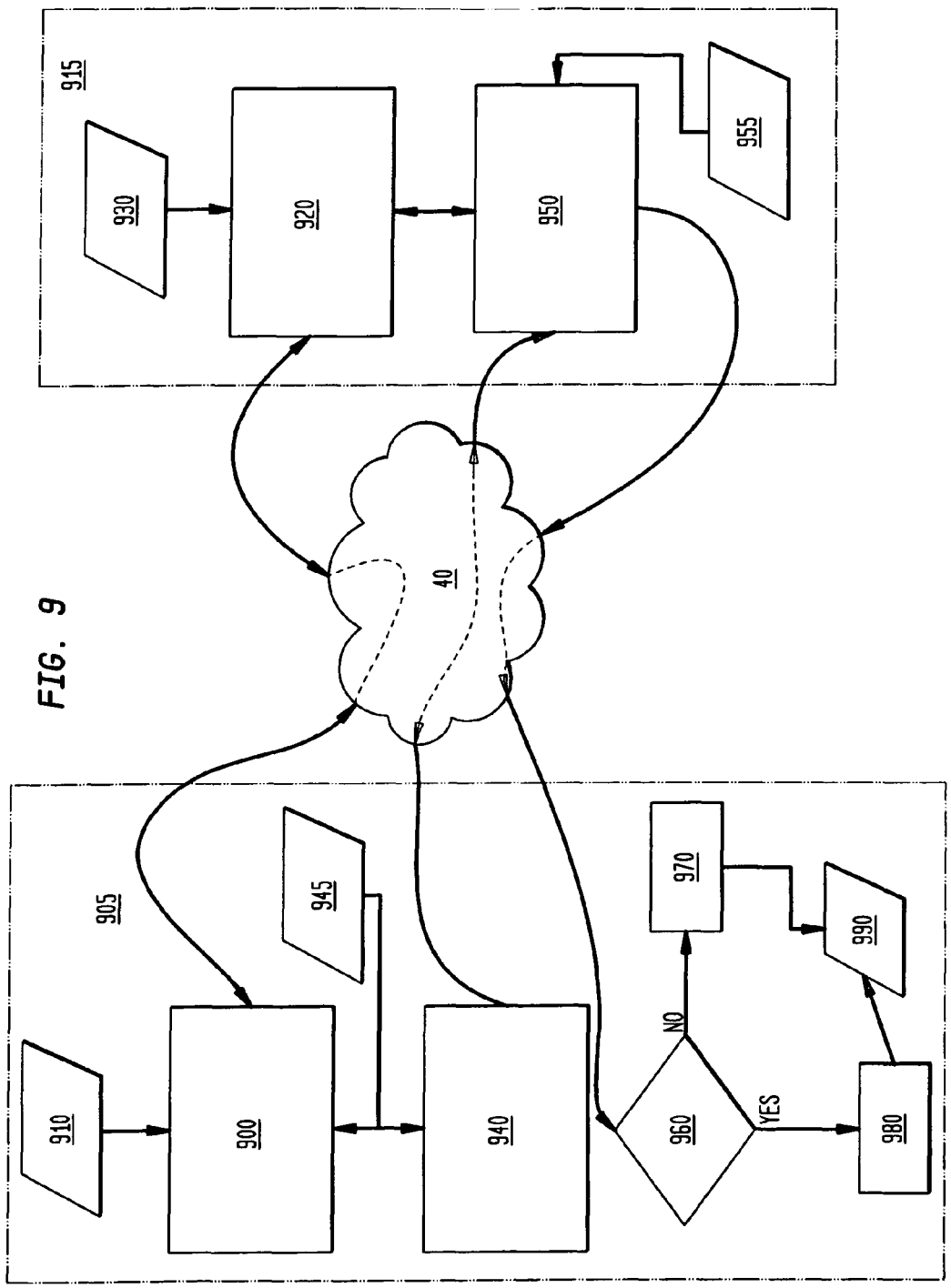
FIG. 9 is a functional flow chart of a user e-mail address confirmation process of a media micro server in accordance with an embodiment of the present invention.

For particular user metadata additional security checks can be employed. For example, FIG. 9 provides one embodiment of a user e-mail address confirmation process 900 (for either a local user or a remote user), where the e-mail address can be verified without further user interaction. The process entails (1) determining the e-mail server associated with the user e-mail address, (2) opening a connection between the micro web server and the e-mail server and logging on, (3) sending a HELO command to the entered e-mail address, (4) upon receipt of a confirmation that the address exists from the e-mail server, closing the connection and verifying the e-mail address is likely to be correct, and (5) upon receipt of a failure to confirm the e-mail address from the e-mail server, or upon failure to find the e-mail server associated with the entered e-mail address, returning an error flagging the user metadata as potentially not valid.

More specifically, in one embodiment shown in FIG. 9, the e-mail confirmation process 900 begins with the submission of an e-mail address 910 at a local server 905. The e-mail address is resolved over a network 40 (via a standard network resolution process such as the DNS Domain Name System of address resolution servers) to an e-mail server 915, which holds e-mail user data 930 that may be related to the submitted e-mail address 910. When the identity of the e-mail server 915 is returned to the local server 905, the local server moves to a server communication step 940, where the local server 905 opens a connection with the e-mail server 915 via a standard "HELO" SMTP command 945 with the submitted e-mail address 910. The e-mail server 915 then returns a message 955 to the local server 905, and at a e-mail authentication decision step 960, the returned message 955 from the e-mail server 915 is tested to see if the e-mail address is valid or not. If the e-mail address (or the e-mail server itself) is invalid, then the process moves to a e-mail address rejection step 970, and returns an e-mail authentication flag 990 stating that the e-mail address is invalid. If the e-mail server 905 returns a standard greeting or other message confirming the e-mail address is valid, then the e-mail authentication decision step 960 moves to an e-mail confirmation step 980, which returns an e-mail authentication flag 990 stating that the e-mail address is valid.

Figure 10:
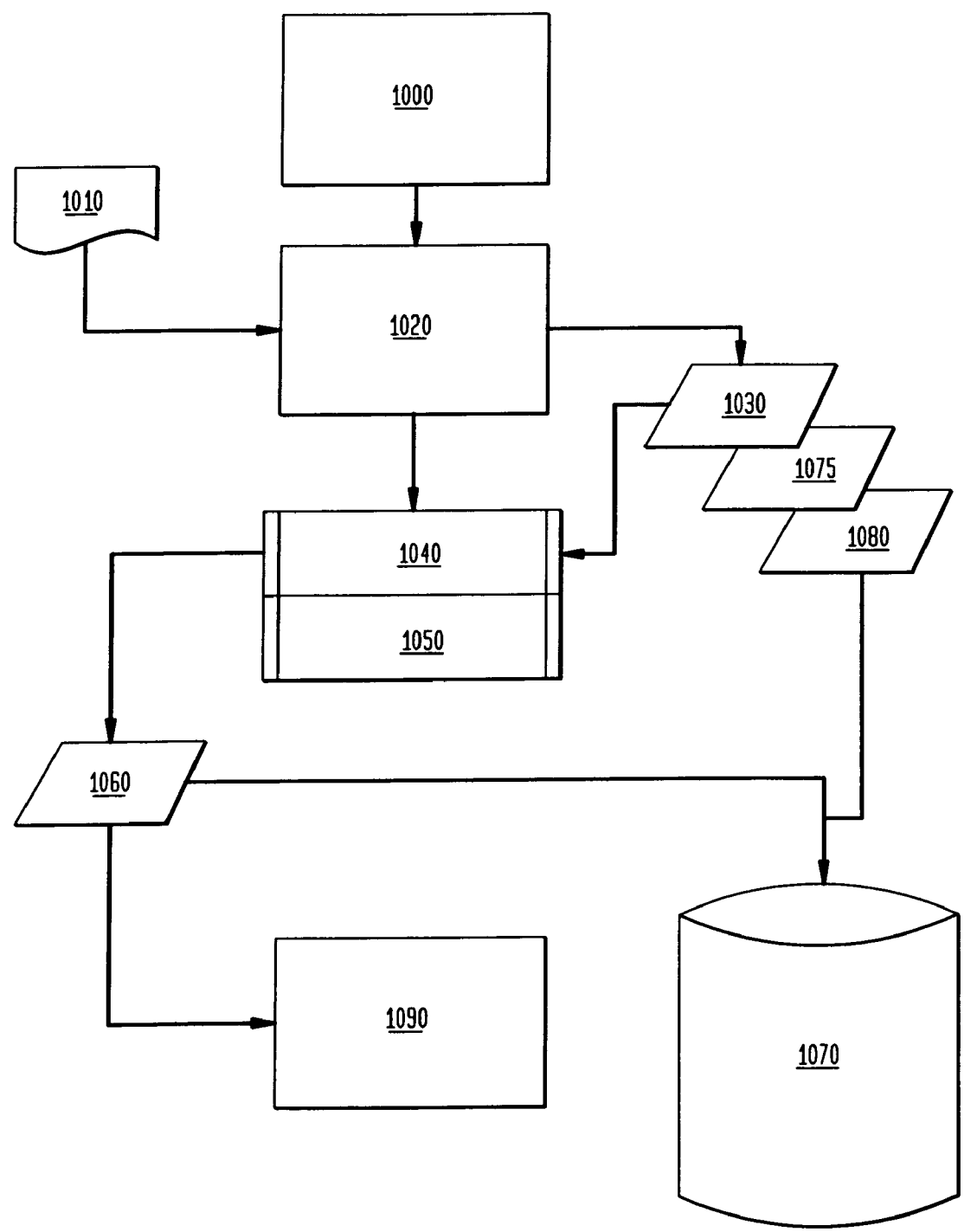
FIG. 10 is a block diagram schematically illustrating conversion of media files to a common or universal format in accordance with an embodiment of the present invention.

Universal Media Format Conversion Module. In order to maximize compatibility of media across many computers and operating systems, a media file conversion module for converting an original media file to a universal media format 510, optionally including a digital rights management encapsulation module 600, is provided. In one embodiment, a universal media format is an MPEG-4 Part 2 compatible video format, an MPEG-4 Part 10 compatible video format, or a non-MPEG wavelet-based codec, or another codec. As shown in FIG. 10 in one embodiment of the universal media format conversion process 1000, upon receipt of an original media file 1010, the media file 1010 is fingerprinted 1020 as described previously. Through the fingerprinting process (see FIG. 8), the media file actual file format 1030 is identified and is converted to the universal media format via a windowing conversion process 1040 whose speed is variable based on the power of the computer on which the system resides. Either parallel with or after conversion to the universal media format, the media file is preferably encrypted via the user security module 1050 described above. The resulting universal media format encrypted file 1060 is forwarded to the user media store library 1070 along with the media fingerprint 1075 and other media data 1080, and the process ends 1090.

Media File Sharing Module. The media file sharing module 1100 provides an interface for remote users to be authorized to share files on the computer in the media store as authorized sharing users. Each remote user so-authorized is provided a user password and user metadata in a manner described above for local users, using standard UNIX-style user account control systems and, preferably, shadow password files. Each local user and each remote authorized sharing user can be given access to all, some, one or none of the media files stored in the media store by granting each user and the like), permissions on an individual user-by-user basis or on a "group" basis. Applying the standard UNIX user account model such as implemented in standard UNIX commands such as chgrp( ), chmod( ), chown( ) (or Microsoft® Windows® analogs such as attrib, cacls, and the like), local users and remote authorized sharing users can be made part of various user "groups," each group having access rights to one or more authorized media files in the media store, and where each group has access to similar or different sets of media files.

Figure 11:
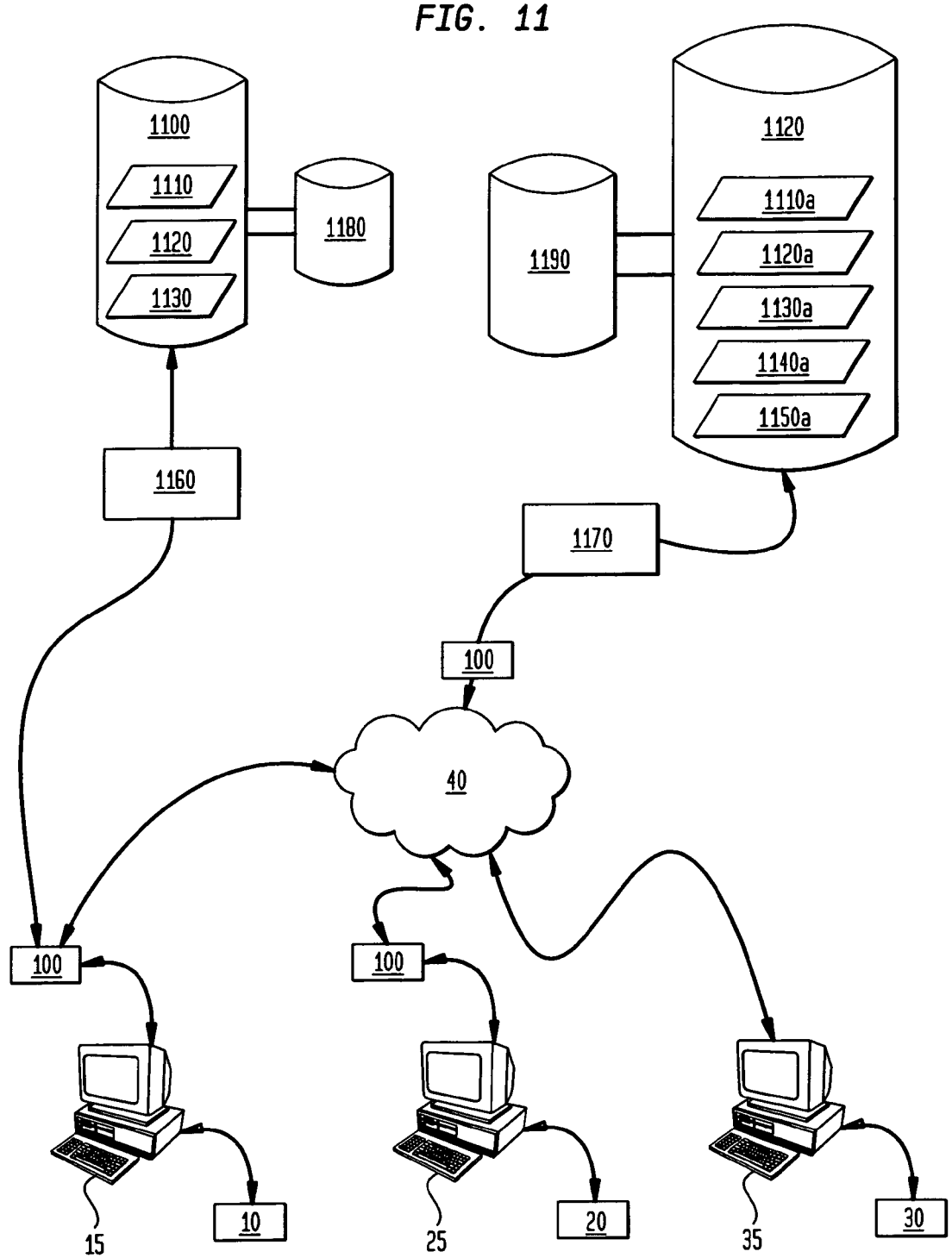
FIG. 11 is a topological representation illustrating media file sharing in connection with a user data local index and global index in accordance with an embodiment of the present invention.

In one embodiment as shown in FIG. 11, a local user 10 on a local computer 15 includes a micro web server 100 coupled to an user authentication module 1160 and a local user database 1100 including specific local user permissions 1110 for the local user 10, as well as remote user permissions 1120 and 1130 for users 20 and 30, on computers 25 and 35 connected to computer 15 on a network 40. The user permission information can be directed by the user 15 and/or can be digital rights management information associated with specific media works. Associated with the local user database 1100 is a local media store database 1180 as previously defined, including media works, media index data, and the like.

The computer 25 includes its own micro web server 100, but computer 35 in this embodiment does not, but can still access links to media works on computer 15 or 25's micro web servers via web links provided by users 10 and 20 respectively. Separate from the local user store 1100 and local media store 1180, over the network 40 the users can also access a remote micro web server 100 with its own user authentication module 1160 and remote user store 1120, including other user data 1110a, 1120a, 1130a for users 10, 20 and 30 respectively, as well as data for other users 1140a, 1150a and so on.

Global Indexing Module. Optionally, a global indexing module on a remote server is provided. The global indexing module receives, indexes, and provides to users three types of information: (1) a maintained index of media files and users associated with those media files, (2) a maintained correlation between each user and a network designation for the computer associated with that user on which the micro web server is installed, and (3) a maintained index of user demographic and user metadata information. The global indexing module can also contain (4) marketing and advertising information, media files, and metadata, (5) digital rights management information associated with individual media files, groups of media files, individual users, groups of users, and the like, and (6) central administrative functions and modules.

The maintained index of media files is compiled from local media indexes forwarded from micro web servers to the remote central server. The centralized index thus permits efficient access to media files by recognizing the same media file (even if differently named or with different metadata) stored in different locations by different micro web servers and by different users, such that popular files can be accessed and shared in a distributed fashion by correlating copies of a requested media file on the global index with particular micro web servers from which to obtain the requested media file upon receipt of a request from another micro web server.

The maintained correlation between users and a network designation for the user's computer on which the micro web server is installed permits remote users and sharing users to access the local user's micro web server without having to determine the local user's technical network address (such as an IP address (internet protocol address) of the form a.b.c.d where each of a, b, c and d are an 8-bit value, an IP v6 address of the form a.b.c.d.e.f.g.h where each of these eight values are 16-bit hexadecimal values, a DNS (domain name system) address of the form hostname.ext where hostname is the name of the computer and .ext is the extension of the form .com, .org, and the like, or another network identifier. In one embodiment, the micro web server sends a predetermined packet to the central server at a known time interval, such that the technical network address from which the predetermined packet is received at the central server is associated with the user until such time as the address from which the predetermined packet is received from a particular micro web server changes. In another embodiment, the micro web server updates its technical network address with the central server when it performs an action related to the central server, such as, for example, sending the central server an updated local index, sending the central server a local user request for a media file, and the like. In order to prevent third parties from interfering with the authenticity of a micro web server and a respective central server, in response to such a request from a micro web server or a predetermined packet from a micro web server, the central server returns an encoded timestamp, confirming the correctness of the network path to the micro web server. Upon such a confirmation, remote users requesting access to that micro web server or to media files stored thereon via the central server are routed to that central server via the technical network information stored at the central server associated with that micro web server.

The maintained index of user demographic and user metadata information is updated from user information forwarded to the central server from respective micro web servers. Moreover, a public web interface to the central server is preferably provided at a principal web address, i.e., shareitnow.org, for example, from which users can register centrally as part of the central server index and database. The public web interface permits users to enter user metadata, search for media files, and the like, using SQL-web interface techniques as are well known in the art. The user e-mail address may be confirmed via the automatic e-mail server checking algorithm described above. After registration, user demographic information such as media file requests to and from the user, the types of media files stored, authorized sharing users associated with the user, and the like, can be stored demographically and used to correlate users for third party marketing, media recommendations, and the like. The user metadata may be, but is not required to be, stored demographically so as to not uniquely identify a particular user's actual identify. In this manner, marketing and advertising information, media files, and metadata, can be forwarded to a user via an associated micro web server via interspersion of personalized advertising content with requested media files, pushed media recommendations, and the like. Similarly, digital rights management information associated with individual media files, groups of media files, individual users, groups of users, and the like, can be stored. In some embodiments, central administrative functions and modules are provided to authorize and deauthorize access to media content, authorize and deauthorize users and sharing groups, authorize and deauthorize particular micro web server or central server features, and the like.

Sharing User Security Module. As described previously, sharing users are preferably authenticated in UNIX style accounts and groups on the computer associated with the micro web server to which each sharing user has access. Sharing user security can be handled locally on each micro web server or centrally on the central server via central server login and redirection to the target micro web server via correlated technical network address for that micro web server, as described previously.

Universal Streaming Media Player. After an original media file is converted to the universal media format, the media metadata is modified to include a universal streaming media player in a standardized software format such as, for example, Javascript, a variant of the Java® programming language created by Sun Laboratories®. Upon a successful authorized request for the media file from a remote user via the remote user's clicking of a link or selection of the media in a standard web browser such as those provided by Microsoft® Corporation as Internet Explorer®, The Mozilla Corporation® as Firefox®, Opera Inc. as Opera®, AOL® Netscape®, and the like, the micro web server transmits the media file in a series of standard HTTP format transactions to the remote user's computer over the network. Upon receipt of the beginning of the media file at the remote user's computer, the universal streaming media player is received and executed by the receiving standard web browser without any further installation of software, codecs, or media players by the remote user. The universal streaming media player then handles further communication between the remote user's web browser and the computer and micro web server sending the requested media file over the network. In this manner, media files may be readily shared with authorized users over a network without requiring a multitude of media formats, media players, media codecs, and the like. One universal media streaming player that can preferably be used with the present invention is the one disclosed in U.S. Pat. No. 6,938,047, issued to Kryeziu entitled "METHODS, DATA STRUCTURES, AND SYSTEMS FOR PROCESSING MEDIA DATA STREAMS," which is hereby incorporated by reference.

The system and methods described herein can support a number of revenue models and business methods, employing (1) banner advertising and rich text media ads; (2) feature plug-ins; (3) remote, online storage; and (4) corporate enterprise functions. In particular, a web-based interface used to interact with the streaming player and overall sharing system can include banner ads using any of the banner ad systems well known to those of skill in the art.

The sharing system and streaming player can preferably be used to interstitially distribute and play advertising messages or sponsored messages to a community of users, based on the users' group of friends, multimedia sharing history, or other personal metadata or statistical data, such that the bandwidth cost of distribution of the advertising messages is distributed among the community of users and playback of the advertising messages is not blocked by unavailability of a particular codec or format.

Additionally, because of the distributed structure of the multimedia sharing system, various plug-in software can be made available to end-users by the system provider and/or by third parties, either for free or for a fee, where the end user's right to use the plug-in is authenticated using the same authentication system, or a similar authentication system, to that described above for confirmation of right to receive a multimedia work through the system. In such a manner, additional features such as an interface to find other users or "friends" on the network, access to new types of multimedia works, or online storage of files including non-multimedia files, can be made available to users of the system.

With respect to online storage of non-multimedia files as well as multimedia files, the system described herein can also be adapted to store, distribute or share non-multimedia files, including documents and software objects, simply by adding a metadata handler for each particular type of file to be used in the system.

Finally, the system can be adopted for corporate enterprise uses, including multi-location conferencing, multi-location file sharing and file distribution with controlled user access, and via the use of customized plug-ins, specialized multi-location and multi-user file storage, sharing, group authoring, and database software uses.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A universal media sharing system for distributed sharing of media content, comprising:

a secure encrypted micro web server including a media file store for storing media files for a local user on a computer and for sharing media files over a network connected to the computer;

a media file fingerprinting module linked to said micro web server for creating media file fingerprints and media file metadata accurately authenticating the content of the user's media files regardless of original media file metadata;

a local user index stored by the micro web server on said computer based on the user's media files and media file fingerprints stored by the micro web server;

a global sharing index of media file fingerprints, media file metadata, local users, and local user metadata stored on a central remote server in network contact with the micro web server;

a sharing group index stored by the micro web server on said computer, said sharing group index including a list of other users authorized to access one or more of the media files stored on the micro web server and available from the micro web server over the network;

a user authentication module linked to the micro web server for authenticating other users for access to the micro web server based on independently verifiable data associated with the other user;

a media file authentication module linked to the micro web server for authenticating a media file as legitimate and correlated to the micro web server and associated media store in which the media file is located;

a media conversion module linked to the micro web server for converting media files to a universal media format upon receipt of a media file at the micro web server, the universal media format including an encapsulated streaming media player coupled to the media file metadata of universal media format files;

a media distribution module linked to the micro web server for at least one of distributed sharing and distributed streaming of a media file to a remote computer over the network via a standard network protocol; and a media sharing module linked to the micro web server for distributing to a sharing user, upon an authenticated request for a media file over the network from the sharing user to the micro web server, such that the sharing user begins to receive the media file in the universal media format and playback begins of the media file at the sharing user through the encapsulated streaming media player without further user intervention and without requiring user installation of a media codec.

2. The universal media sharing system of claim 1, further comprising a header region for digital rights management information in said universal media format, said digital rights management information being transferred from the original format of said media file to said header region upon conversion of the media file to universal media format.

3. The universal media sharing system of claim 1, wherein the independently verifiable data associated with another user is an authenticated e-mail address and an authenticated unique user identification value, said authenticated e-mail address obtained via an e-mail authentication module that confirms the validity of an other user's e-mail address without further other user intervention and via an authenticated unique user identification value associated with the other user's micro web server.

* * * * *

UNITED STATES PATENT AND TRADEMARK OFFICE
CERTIFICATE OF CORRECTION

| | | |
|---|---|---|
| PATENT NO. | : 7,783,767 B2 | Page 1 of 1 |
| APPLICATION NO. | : 11/900909 | |
| DATED | : August 24, 2010 | |
| INVENTOR(S) | : Caesar Collazo | |

It is certified that error appears in the above-identified patent and that said Letters Patent is hereby corrected as shown below:

In the specification:

Column 12, line 15 after "media" insert --files.--

Signed and Sealed this
Twenty-ninth Day of November, 2011

David J. Kappos
*Director of the United States Patent and Trademark Office*